Figure 12:
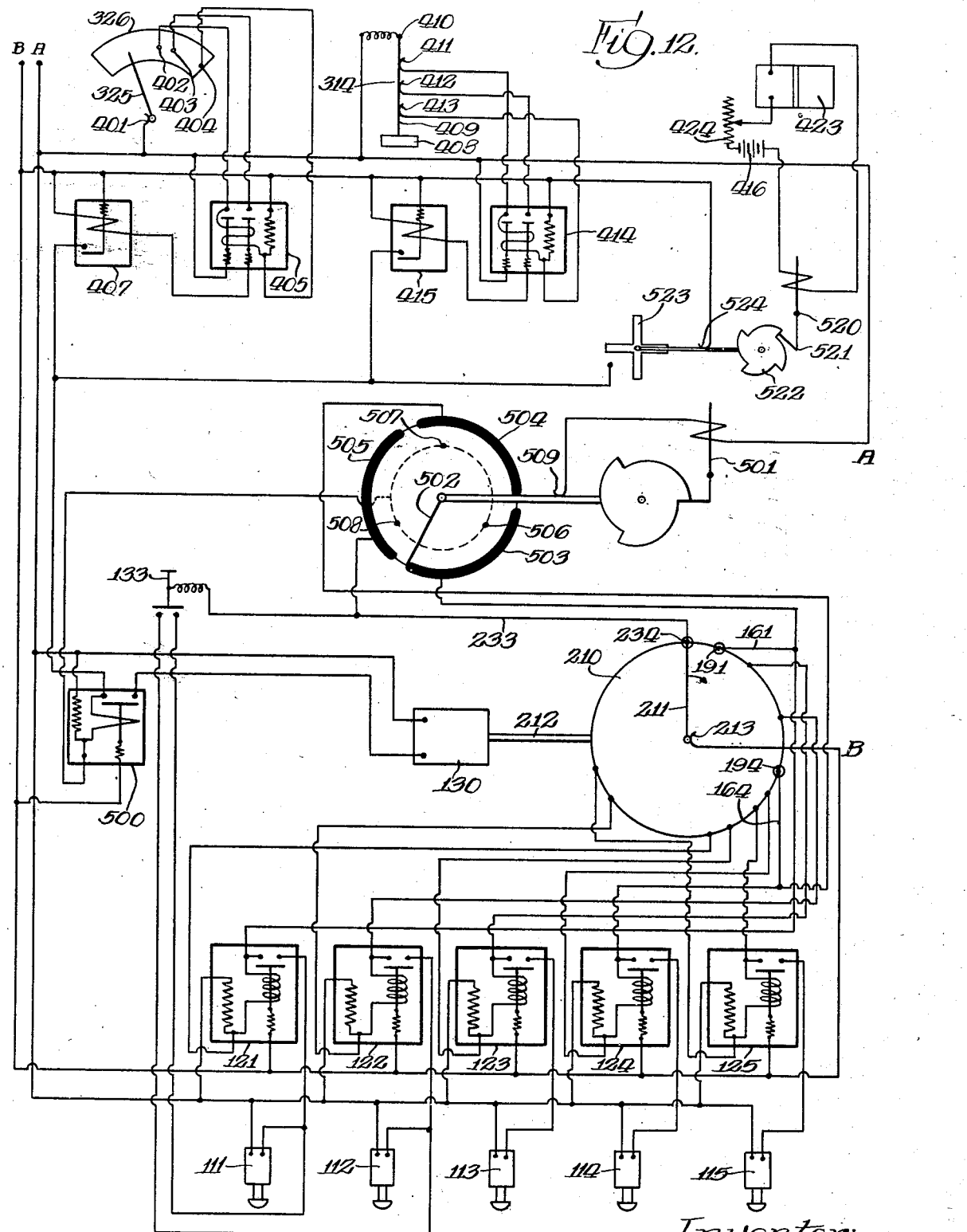

Oct. 15, 1940.  W. J. HUGHES  2,217,751
PROGRAM CONTROL
Filed Sept. 24, 1937    8 Sheets-Sheet 1
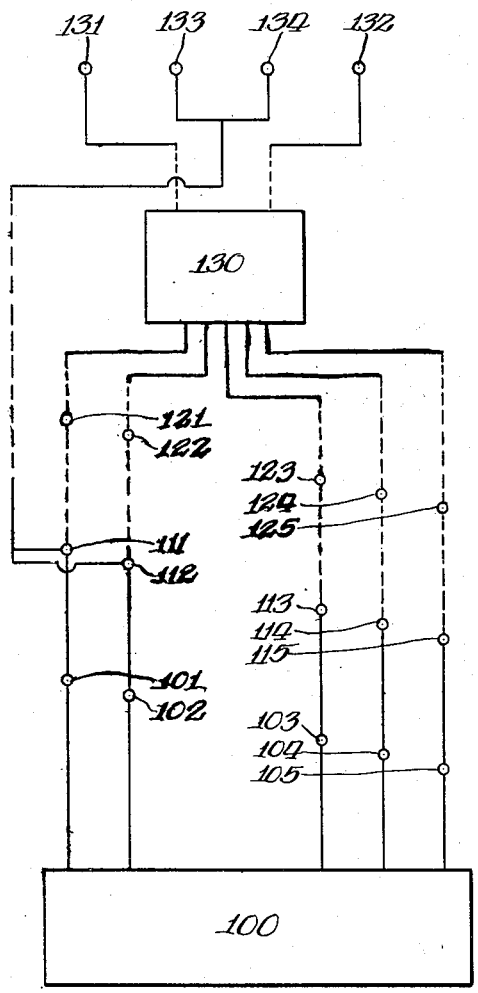
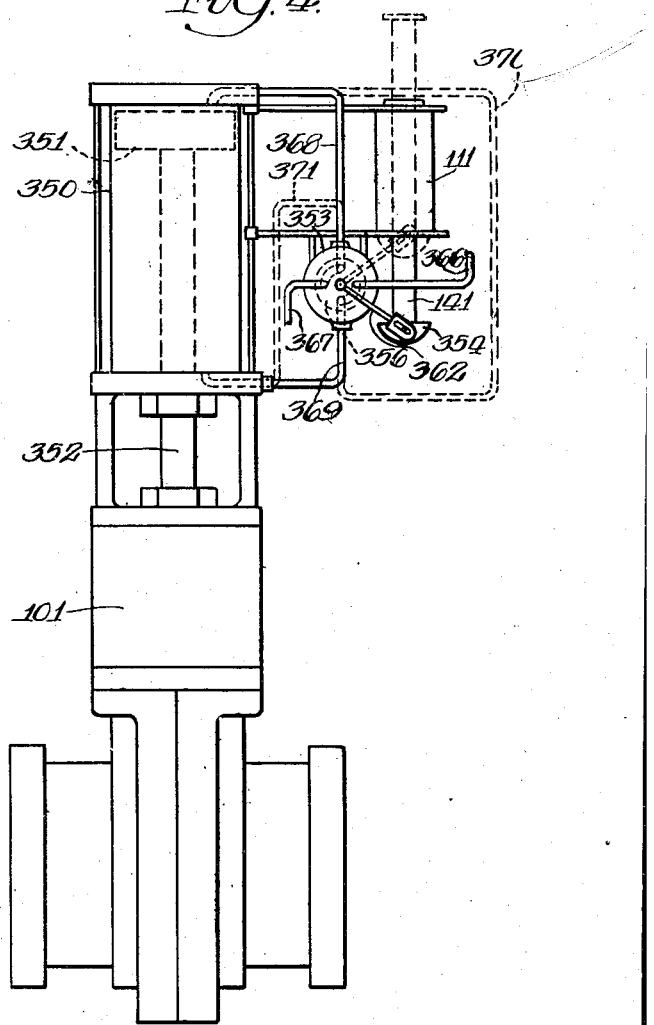
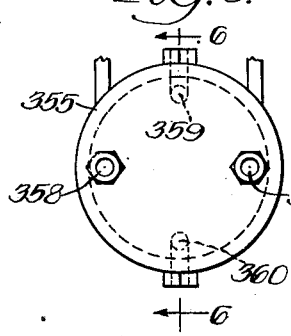
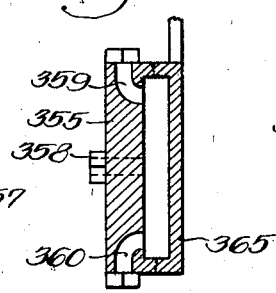
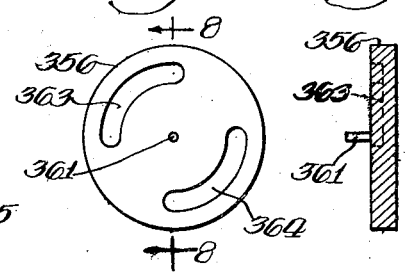
Inventor:-
Walter J. Hughes

Fig. 2.

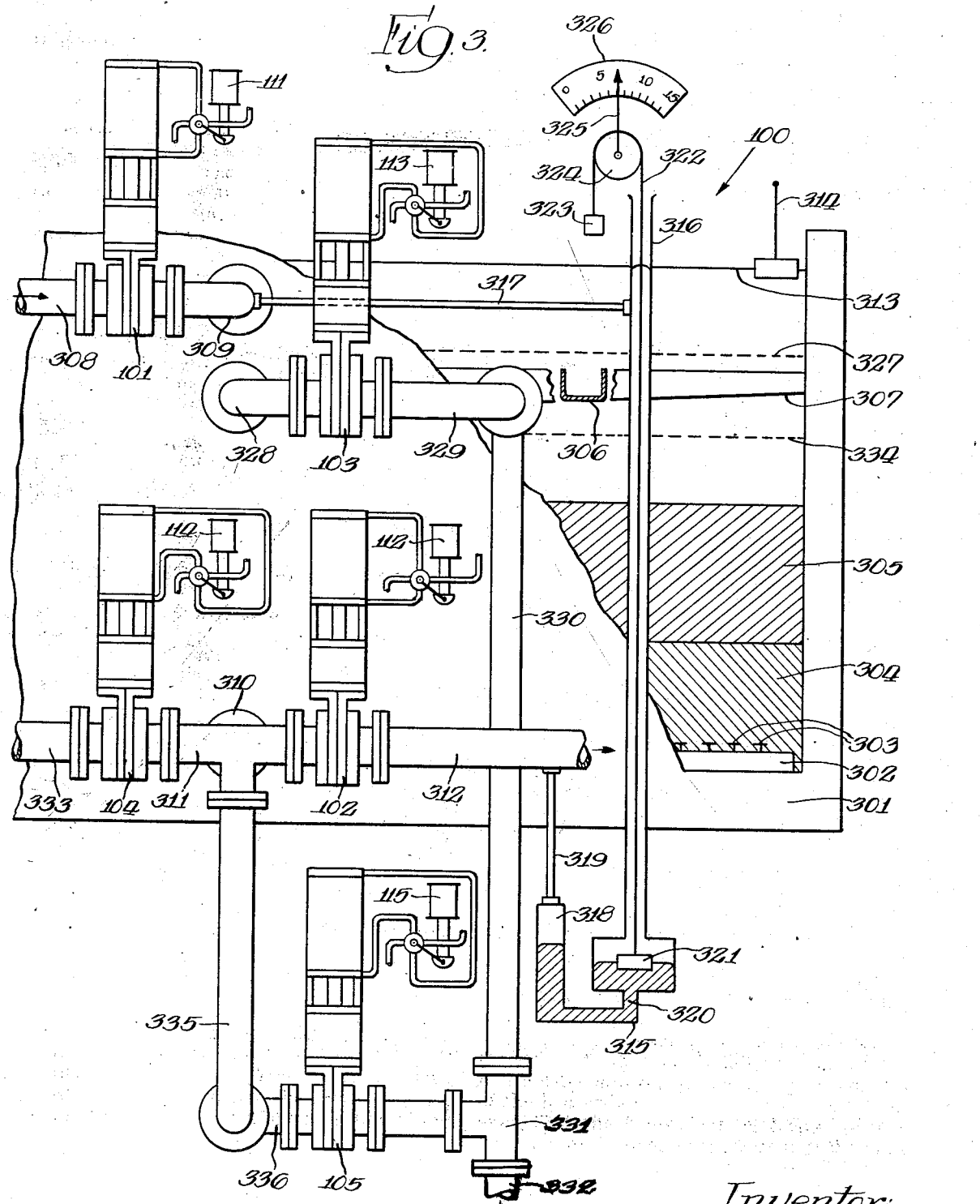

Oct. 15, 1940.    W. J. HUGHES    2,217,751
PROGRAM CONTROL
Filed Sept. 24, 1937    8 Sheets-Sheet 4
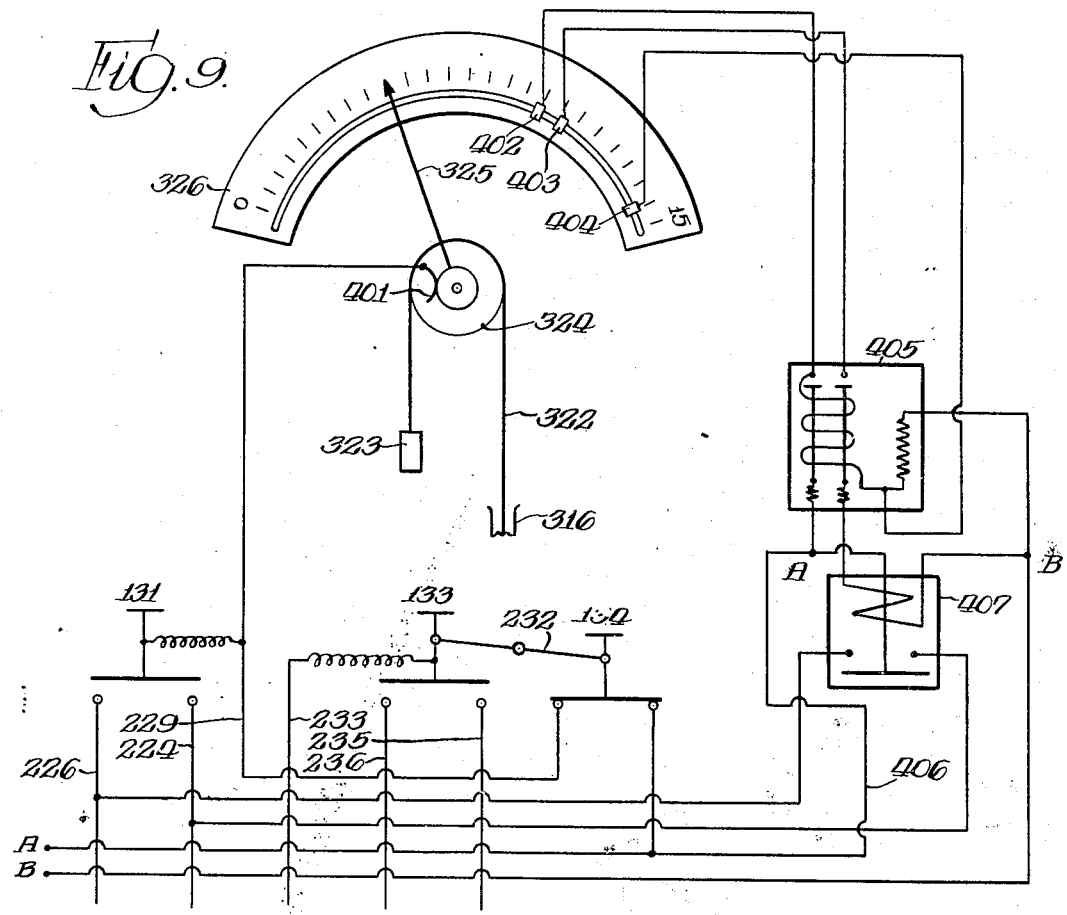
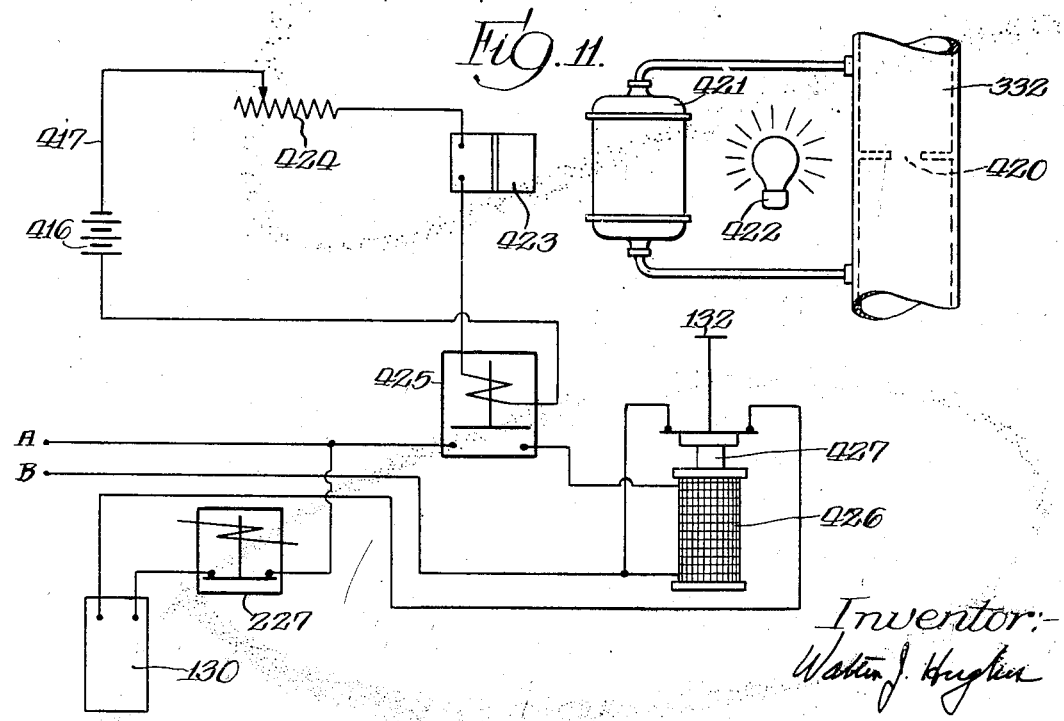
Inventor:-
Walter J. Hughes

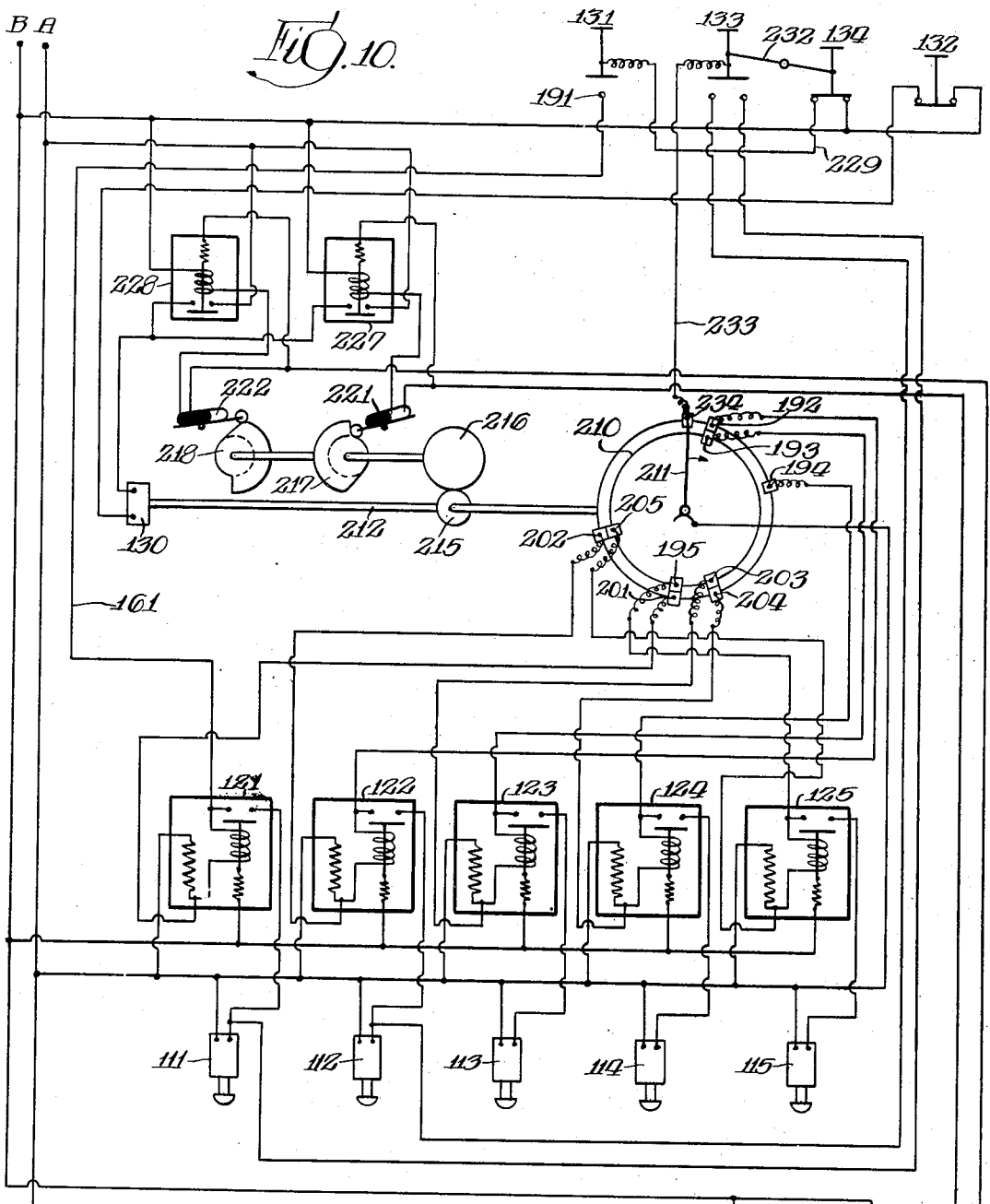

Oct. 15, 1940.   W. J. HUGHES   2,217,751
PROGRAM CONTROL
Filed Sept. 24, 1937   8 Sheets-Sheet 7

Inventor.
Walter J. Hughes

Oct. 15, 1940.  W. J. HUGHES  2,217,751
PROGRAM CONTROL
Filed Sept. 24, 1937    8 Sheets-Sheet 8
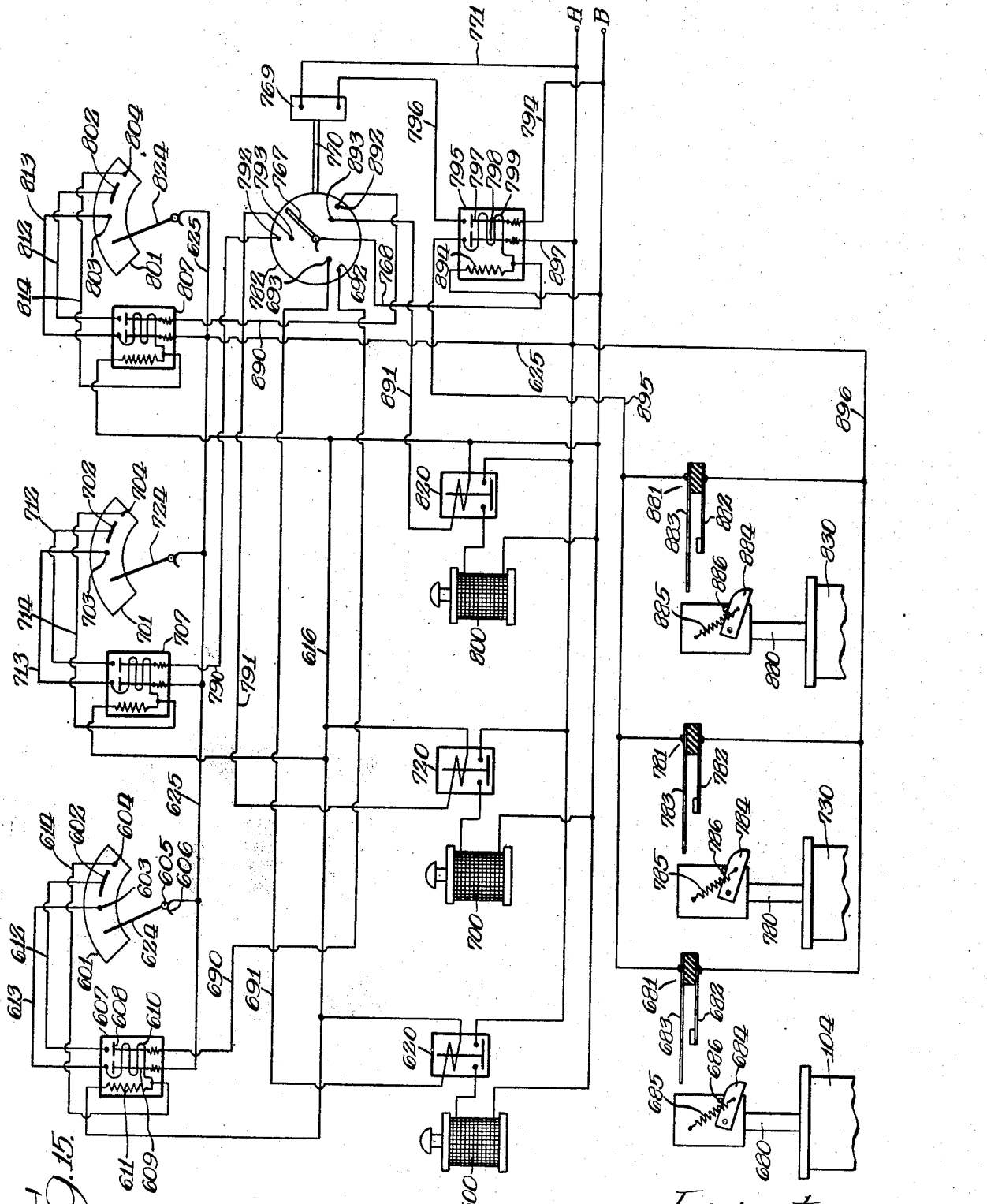
Inventor:
Watson J. Hughes Patented Oct. 15, 1940

2,217,751

UNITED STATES PATENT OFFICE 2,217,751

PROGRAM CONTROL

Walter J. Hughes, Chicago, Ill., assignor to Infilco, Inc., Chicago, Ill., a corporation of Delaware Application September 24, 1937, Serial No. 165,494

2 Claims. (Cl. 210—130)

The present invention relates to electric control and has particular reference to an electric system adapted to control a program of a physical, chemical or biological process medium.

In many processes or methods of physical, chemical or biological treatment, there may be observed a more or less uniform and definite series of conditions, both in substances under treatment and in the treating material or process medium; and in many instances, if the process medium is properly operated, a series or cycle of distinct conditions may be produced therein over and over again. For instance, certain filter beds, as well as other solids and/or fluids in treatment or reaction chambers of many descriptions, may be operated in cycles, and such cycles may include various steps, herein referred to as phases or functions. In some instances, a series of functions may follow of necessity where a certain condition has once been established. In other cases it is possible or necessary to control some or all of the functions of a cycle as the process advances, and such a plurality of intentionally directed functions which may be controlled either manually or automatically, is termed a program. Automatic program control may be, and often is, both cheaper and more efficient than manual program control, by plant operators, may practically be.

In other processes, for instance in many biological treating methods, any one of a number of known conditions of a process medium may practically turn up at any time. A medium of this type does not usually lend itself very readily to automatic operation, there being no definite program to be followed. However, it may be possible by means of dependable instruments to automatically detect certain conditions even in a medium of this kind; and it may be desirable to have such automatic condition detectors and/or indicators start a series of functions, constituting a part program or, if possible, a full program. In still other processes, as occur, for instance, in inner combustion engines or the like, there may be found a definite operating program which, due to frequency or other characteristics of functions included therein cannot be manually controlled at all, except for the starting and stopping of the whole apparatus. Most automatic program controllers, both electric and otherwise, which are known to the art, have been developed for such apparatus.

Special problems are encountered where, due to the character of the process or apparatus, manual interferences with an automatic program, or automatic interferences of one automatically controlled program or function with another, are desirable or necessary. In such events, an automatic program controller should be elastic enough to allow for direct or preselected interference as required, but should be provided with such interlocking features as render unnecessary and harmful interferences impossible or inoperative. The present application is particularly concerned with certain interferences as referred to.

Manual interferences as herein referred to means irregularly starting, stopping or otherwise controlling individual functions of an automatic program. An automatic controller providing for manual start of a program is generally referred to as semi-automatic. All types of manual interference should be distinguished from manual adjustment of automatic control means, which is another feature of program controllers as herein referred to.

Furthermore, control setting or regulating means should be differentiated from operating or control applying means, also from function termininating or controlling means. When and as a process medium is caused to perform any function, for instance, when a heating chamber is being charged, fired or cleared, certain operating means such as stokers, stacks, conduits or valves are required to operate, and the operation of the same may be governed by control setting or regulating means, if it is not governed by hand. The operating means are either integral or relatively closely associated with the process medium, while regulating means may be remote or less closely associated. Each function of a process medium, regardless whether manually or automatically regulated, involves certain operations and/or positions of some operating means.

There will be described in the following, for purposes of illustration, a water filter of the gravity type, such as used in many municipal and large gravity plants for water purification. The sand bed of such a filter is a process medium, and the several valves thereof are operating means as defined above. Reference will be made in the following to certain additional means which indirectly operate and control the filter bed; such as pilot valves controlling the operating valves; solenoids controlling the pilot valves; electric circuits controlling the solenoids; and contact making and breaking devices controlling the electric circuits. A synchronous motor and/or certain other instruments control the contact making and breaking devices and are used as sources of automatic program control.

A principal object of my invention is to provide an electric control device adapted to control a program of a physical, chemical or biological process medium as referred to.

Another object is to provide an electric control device adapted to remotely control a program, including a plurality of functions or phases, of a filter bed or similar process medium, and allowing for manual interference with certain functions or phases, in predetermined ways and during predetermined periods of time only.

Another object is to provide a program controller as referred to, having means for manually suspending the automatic control of certain program functions when and as long as circumstances require.

Another object is to provide a program controller as referred to, having means for manually, selectively and remotely interfering with certain program functions, such interference being made effective when circumstances require and/or allow the same to become effective.

Another object is to provide a program controller as referred to, having means for starting a program, automatic means for controlling and/or completing such program and/or for alternately rendering said starting means operative or inoperative.

Another object is to provide a program controller as referred to, having means for starting a program, automatic means for controlling and completing such program, and operating means including several individual groups of devices, each group including individual and largely uniform chains of devices, said devices of each chain controlling one another and the last devices of the several chains cooperating to control a process medium.

Another object is to provide a program controller as referred to, having means for starting a program, automatic means for controlling such program through different phases, and operating means including primary and secondary controlling devices, each of said primary and secondary controlling devices being alternately in inoperative and operative condition during a program, and all such secondary controlling devices which are in inoperative condition during a certain phase, being disposed in an individual group adapted to be put in operative condition by separate means.

Another object is to provide an electric control device adapted to control a program of a process medium and having means for starting a program, automatic means for controlling and/or completing such program, electric operating means controlled by said automatic means, and other operating means controlled by said electric operating means and controlling said process medium, all of said electric operating means being normally inoperative during certain phases of a program, while some of said other operating means are operative during said phases.

Another object is to provide an electric control device adapted to control a program of a process medium and having electric means for starting a program, automatic electric means for controlling and/or completing such program, electric operating means controlled by said automatic means and each of which is alternately in inoperative and operative condition, and other operating means, controlled by said electric operating means and controlling said process medium and some of which form a group being in operative condition when the respective electric operating means controlling the same are in operative condition, while other such operating means form a group being in inoperative condition when the respective electric operating means controlling the same are in operative condition, one of said groups being adapted to be operated by an additional and normally inoperative means.

Another special object is to provide a controller adapted to control a program including functions or phases of substantially different length and/or character, of a physical, chemical or biological process medium.

Another object is to provide a controller adapted to control certain sets of functions on a time basis and other sets of functions, or individual functions, on a basis determined by instrument controlled condition detectors, said several functions collectively forming a program.

Another object is to provide a program controller as referred to, having several means each for automatically starting a certain function of a program, other means for automatically controlling certain functions thereof, other means each for operating a process medium during some of said functions, still other means for automatically terminating said functions, and interlocking means to selectively and consecutively operate said several means.

Another object is to provide a program controller as referred to, having condition controlled means each for automatically controlling certain functions of a program, time controlled means for automatically controlling certain other functions thereof, other means each controlled by some of said condition controlled means and/or time controlled means and adapted to control a process medium during some of said functions, and interlocking means to selectively control said condition controlled and time controlled means.

Another special object is to provide a program controller as referred to, adapted to consecutively control certain phases of the programs of a plurality of similar units.

Another object is to provide a program controller as referred to, adapted to automatically and consecutively control and/or operate certain phases of the programs of a plurality of similar units, the sequence of the several units to be controlled and/or operated being selectively determined by automatic means.

Another object is to provide a program controller as referred to, adapted to consecutively start and control certain phases of the programs of a plurality of similar units, the sequence of the several units to be controlled being selectively determined by automatic means, and said automatic means being started by condition detectors disposed in the several units.

Figure 13:
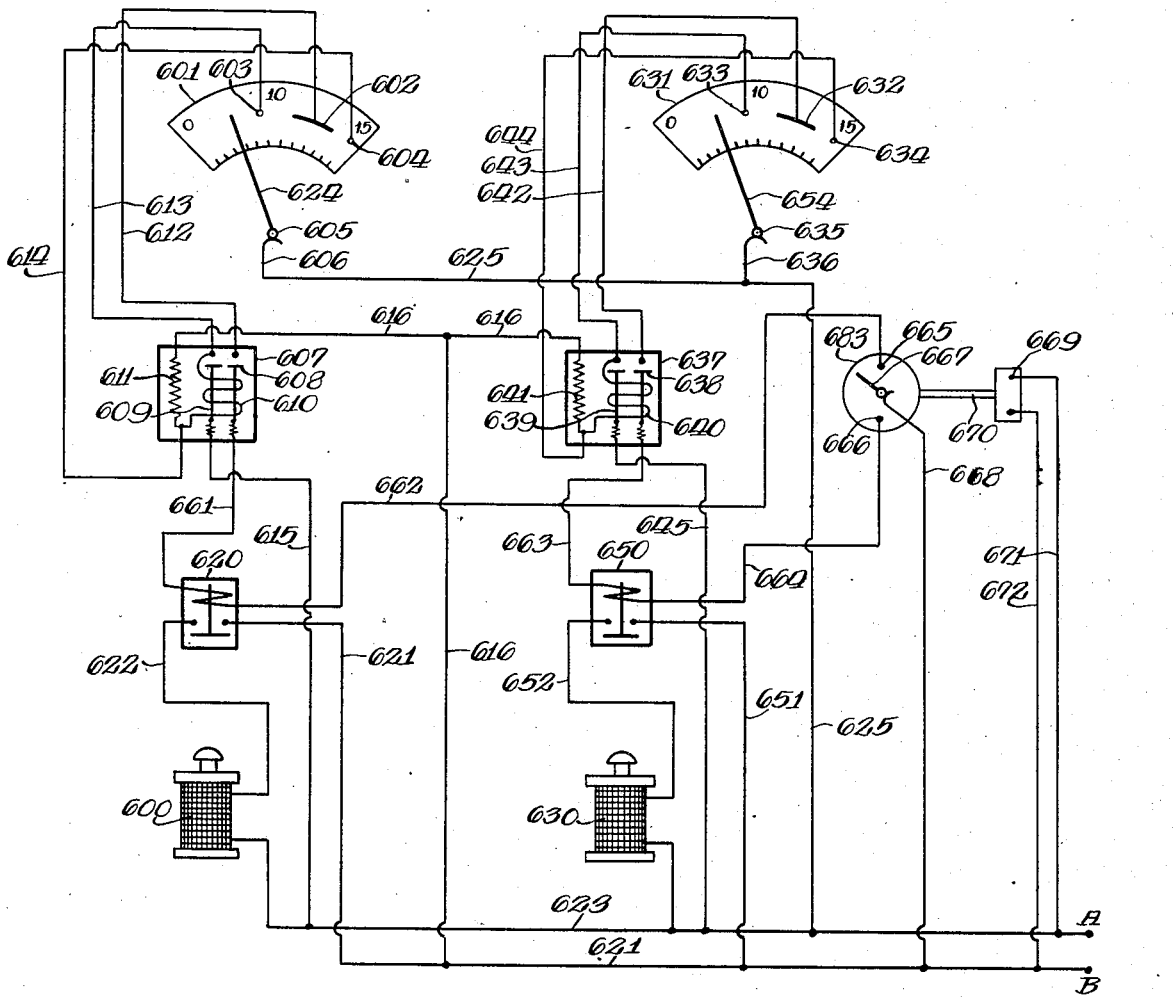
Figure 14:
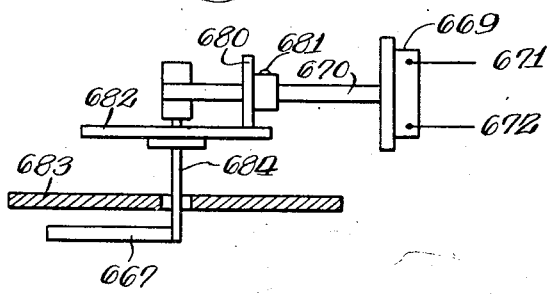

These and other objects will be evident from a consideration of the following specification and by reference to the accompanying drawings, in which Figure 1 is a diagrammatic chart of a program timer constructed in accordance with my invention; Figure 2 is a wiring diagram of electric control circuits employed in a preferred system according to Figure 1, including circuit making and breaking devices and solenoids to be actuated by the circuits; Figure 3 is a front view, partly in section, of a filter forming a part of Figure 1, with piping, valves and other operating means, the valves being actuated by the solenoids of Figure 2; Figure 4 is a more detailed front view of one of the valves of Figure 3; Figure 5 is a front view of the stationary member of the pilot valve shown in Figure 4; Figure 6 is a sectional view of the same, taken along lines 6—6 of Figure 5; Figure 7 is a front view of the movable member of the same pilot valve; Figure 8 is a sectional view of the same taken along line 8—8 of Figure 7; Figure 9 is a part diagram of a modification of Figures 2 and 3; Figure 10 is a diagram of another modification of Figure 2; Figure 11 is a part diagram of still another modification of Figures 2 and 3; Figure 12 is a complete wiring diagram showing a system including the several modifications as illustrated in Figures 9, 10 and 11; Figure 13 is a part wiring diagram of electric control circuits employed in a system including two units according to Figure 1, adapted to be started and controlled consecutively; Figure 14 is a detail of Figure 13; and Figure 15 is a part wiring diagram of electric control circuits employed in a modified system including three units.

DESCRIPTION IN GENERAL (Figure 1)

In order that a general understanding of the relation of the main parts of my apparatus may be had, reference is made to the purely diagrammatic chart of Figure 1.

A single filter, or a similar apparatus, indicated by 100 is shown subject to several operating valves or primary operating devices, including influent valve 101, effluent valve 102, waste valve 103, backwash valve 104 and rewash valve 105. Each operating valve is subject to control by secondary operating devices including a solenoid and a relay. The solenoids, which control the respective operating valves are indicated by the figures 111, 112, 113, 114 and 115. Each solenoid is subject to control by a relay 121, 122, 123, 124, or 125. The several relays in turn are subject to control of a timer motor 130, controlled by a program switch 131 and prolong switch 132.

The solenoids belonging to inlet and outlet valves 101 and 102 are also collectively subject to control from two push buttons termed shut-off button 133 and service button 134. In that respect, and otherwise, these two solenoids and the devices controlled by the same and controlling them form a separate group of control elements.

Stated briefly, depressing program push button 131 will start timer motor 130 which will normally control relays 121, 122, 123, 124 and 125 through a series of operations and positions, to operate solenoids 111, 112, 113, 114, and 115 and valves 101, 102, 103, 104, and 105 through a corresponding series of operations and positions forming a program of filter 100. Since it may be desired now and then to prolong one of the valve positions and corresponding filter operations beyond its normal period, this is provided for by the prolong button 132, which will stop timer motor 130 in any position as long as depressed. Also, since it may be desired at irregular times to be able to cut a filter out of service and later restore it to service, this is provided for by the shut-off and service push buttons 133 and 134, which control operation of solenoids 111 and 112, regulating operation of the two valves required for filter operation as long as the filter is in service.

A full description of electric circuits and other features, in the above outlined system and in certain modifications thereof will be found in the following paragraphs. However, it will be noted right here that the system as herein described allows for several groups of cooperating elements being disposed in remote or close relation, as may be most desirable in each case. In particular, the following groups of elements may be disposed remote from each other: (a) filter 100 with valves 101, etc., and solenoids 111, etc.; (b) relays 121, 122; (c) relays 123, 124, 125; (d) timer 130, (e) program button 131; (f) prolong button 132; (g) shut-off and service buttons 133 and 134.

ELECTRIC CIRCUITS (Figure 2)

The wiring diagram of Figure 2 will be more readily understood by considering it as separated into two groups of circuits, namely, those controlling timer motor 130 and those controlled thereby and controlling the several solenoids through the corresponding relays. The latter will be taken up first.

Solenoids 111, etc., have armatures 141, etc., and are connected in parallel to a source of circuit A. Each solenoid 111, etc., is also connected, through a lead 151, etc., to one of two front contacts disposed in relay 121, etc., and the poles or switch members of said relays are connected in parallel to source B.

Relays 121, etc., are 3-wire relays adapted to be energized by circuits received from B through wires 161, etc., through the respective coils and resistors, and wires 171, etc., joining source A; and to be deenergized by circuit from B, through wires 181, etc., the respective resistors and wires 171 connected to A. Wires 161, etc. and 181, etc. may be connected to B as follows:

A series of contacts 191, 192, 193, 194, 195 and a similar series of contacts 201, 202, 203, 204, and 205 are adjustably secured to and insulated from a dial 210. An arm 211, which rotates over dial 210 is adapted to wipe the several contacts. Arm 211 is secured to and insulated from shaft 212 driven by the synchronous low speed timer motor 130; and arm 211 receives circuit from B, through brush 213. Contacts 191 through 195 are connected, respectively, to leads 161, etc.; and contacts 201, etc., are connected, respectively, to leads 181, etc.

Shaft 212 also rotates shaft 214 by the pinion 215 and the gear 216; the ratio of the gearing being two to one. The shaft 214 drives the cams 217 and 218 which are shaped substantially alike but set 180° apart, and engage respectively the rollers 219 and 220 of mercoids or limit switches 221 and 222, dropping the same after a 180° effective turn each. These mercoid switches form part of circuits controlling timer motor 130 which will be described now.

Mercoid 221 is connected to leads 223 and 224 and mercoid 222 is connected to leads 225 and 226. Leads 224 and 226 terminate, respectively, at the normally open program switch 131. Wires 223 and 225 are connected, respectively, to the coils of relays 227 and 228; and the coil circuits are completed to B.

Each relay 227 and 228 is normally open and is adapted when closed, to operate as a main switch, completing a circuit from A through timer motor 130, which is connected to B through the normally closed prolong switch 132. Switch 132 is adapted to be depressed and to be locked depressed by manually turning it, say 90°.

Relays 227 and 228 have pigtails connected, respectively, to leads 224 and 226.

The contact member of program switch 131 is connected by a lead 229 and by the normally closed service switch 134, to source A.

Service switch 134 includes a contact member secured to and insulated from a push button 230. A similar push button 231 is provided in shut-off switch 133. Push buttons 230 and 231 are mechanically connected by a spring toggle 232, so that shut-off switch 133 will be open as long as service switch 134 is closed and vice versa. The contact member of shut-off switch 133 is connected by lead 233 to a contact 234 disposed on and insulated from dial 210 and which will be contacted by arm 211 when the latter is in its zero or starting position. Shut-off switch 133 also includes the terminals of two legs 235 and 236, which lead, respectively, to wires 151 and 152.

It will be remembered that Figure 2 is purely diagrammatic and as a consequence all transformers, fuses, and similar devices which are obvious to those skilled in the art are omitted. Some of the circuits as herein described may, of course, be slightly modified by interposing such devices; and otherwise. It will be simple to adjust the herein given description of circuits and to adapt the operation thereof which will be described later, to any such modified system, although this may involve certain changes both in terminology and design.

FILTER SYSTEM AND PROGRAM (Figure 3)

Referring now to Figure 3, it will be noted that solenoids 111, etc., form parts of valve mechanisms disposed in the conventional piping system of a gravity filter 100.

Filter 100 as shown has bottom 301, a system of underdrain pipes 302 disposed thereon and provided with nozzles or strainers 303, a graded layer of gravel 304 over the underdrain pipes, and a layer of filter sand 305 supported by gravel 304.

Troughs 306 are disposed in the upper part of filter 100 and are connected by a gullet 307.

Water to be filtered and which may or may not be pretreated by coagulating or similar apparatus (not shown) enters through pipe 308, influent valve 101, and elbow 309, while filtered water is withdrawn through underdrain pipes 302, header or pipe 310, T 311, effluent valve 102 and pipe 312 to service. All other valves are closed during filtration.

Incident to the purification of water being filtered through sand bed 305, such impurities and/or coagulated matter as are removed from the water will collect upon and within said bed; and granules of said bed will become coated with impurities. By and by a considerable amount of dirt, etc., will collect; also the filter sand will show some tendency to pack. As a consequence there will be found a considerably increasing difference of water pressure, or so-called loss of head, from top to bottom of the filter.

The head on top of the filter bed will be determined by the level of water in filter 100, indicated at 313, which may be maintained by any suitable means such as a level controller, the gauge of which is shown at 314. The head on bottom of the filter bed will be determined by the same water level 313, and by the varying and normally increasing resistance that the bed offers to the flow of water through the same. A means to continuously and automatically measure the loss of head through the filter is shown as including a U tube 315 having a high pressure leg 316 connected to elbow 309 by hydraulic lead 317, low pressure leg 318 connected to pipe 312 by lead 319, mercury seal 320 in U tube 315, a float 321 riding on the mercury in high pressure leg 316, a cable 322 connected to said float and held taut by a weight 323, over a pulley 324 which actuates a pointer 325 moving over dial 326.

At the start of filtration, the coating of granules of the filter bed may lead to an improved screening effect, involving better adsorption of impurities. However, if and as the accumulation of dirt, etc., and packing of the sand bed goes on, it may reach a point where water tends to break through the filter bed, and to channel through the same in large part unfiltered. This is prevented by periodically backwashing the filter bed in an upward direction and at a considerable rate, flushing out such impurities as have been retained in the sand, and loosening up the latter for a new start of filtration.

A standard program for a filter as shown is as follows:

Ordinary filtration is applied either continuously or intermittently, and such operation is continued until pointer 325 indicates the maximum allowable loss of head, generally about 15 feet. Thereupon, influent valve 101 will be closed—program operation (a). Effluent valve 102 remains open and as a consequence, the water level will be lowered from 313 to a point in the neighborhood of mark 327. This operation (b) is termed "draining to effluent," and is intended to save the appreciable amount of water between marks 313 and 327. On reaching or approaching mark 327, troughs 306 will be connected through gullet 307, elbow 328, waste valve 103, elbow 329, elbow 330, T 331 and pipe 332 to waste—operation (c). Thereupon the water level will almost instantly drop to the upper level or weir of troughs 306. This process, which may form a part of or may follow operation (c) is termed "draining to waste" and serves, among other things, to quickly establish a predetermined water level in filter 100 before backwashing is started. Following it, pipe 333 will be connected through backwash valve 104, tee 311, and header 310 to the underdrain pipes 302—operation (d). Thereupon the water will pass through strainers 303, upwardly through gravel 304 and sand bed 305 and will spill over the upper edges of troughs 306, to be withdrawn through gullet 307, elbow 328, waste valve 103, elbow 329, elbow 330, T 331 and pipe 332 to waste. During such backwash operation (e) the sand will be loosened up, the bed expands to a level in the neighborhood of mark 334, and the impurities will be flushed out to waste with the water withdrawn through troughs 306, etc. At the end of the backwashing operation, backwash and waste valves 104 and 103 will be closed; water will again be admitted through influent valve 101, to be filtered through bed 305 and to be collected by underdrain pipes 302, and will be directed through pipe 310, T 311, elbow 335, elbow 336, rewash valve 105, T 331 and pipe 332 to waste—operation (f). This will start the so-called rewash or filtering to waste operation (g), which serves to again build up the water level in filter 100 from the edge of troughs 306 to mark 313, so that sand bed 305 may properly settle after it has been expanded up to mark 334. At the end of rewashing, effluent valve 102 will be opened again and rewash valve 105 will be closed—operation (h). This will start another filtering period (i).

Function (i) as described may be termed the filtering phase of a complete program, while functions (a) to (h) collectively may be referred to as the washing phase, function (e) being the most material part of this phase. A filter program as hereinafter referred to starts with function (a) which is the first operation of a washing phase, and includes the two phases as described.

The first or washing phase of a program includes a plurality of functions. Each of functions (a), (c), (d), (f) and (h) includes one or more operations of some of valves 111, etc.; these functions may be referred to as "valve operations". Functions (b), (e) and (g) may be referred to as "valve positions." A valve operation always starts and stops what may be termed functions or operations of the filter; and each valve position corresponds to such a filter function or operation.

The second or filtering phase of a program—function (i)—is normally much longer than a complete washing phase, often being of from 20 to 30 hours duration in continuous operation of the filter. A complete washing phase may take but as many minutes.

The valve operations of a program include the positive steps of opening each valve and the reversing steps of closing each valve, certain valves being closed first and opened later during a program. In each valve operation, the valves affected may be operated either simultaneously or individually. The latter may be preferable in best practice. An arrangement of contacts as described above allows for a close control over the sequence of valves to be operated during each valve operating function. A still better arrangement for the same purpose will be described later.

In order to substantiate, for purposes of illustration, some actual periods of time as may be assigned for the several functions of the above described filter program, the following tabulation will suffice.

Valve structure and reverse connection feature

(Figures 4 to 8)

Figure 4 shows diagrammatically how an operating valve may be controlled by solenoids 111, etc., when constructed as an ordinary pilot operated gate valve. Influent valve 101 is shown for purposes of illustration.

A hydraulic cylinder 350 is mounted on valve body 101 and includes a piston 351 which actuates the valve through stem 352. A pilot valve 353 controls the admission of pressure water and withdrawal of waste water from and to the ends of cylinder 350, and pilot 353 is actuated, alternately, by a solenoid 111 and by a weight 354 secured to armature 141 of said solenoid.

Pilot valve 353 includes a stator 355 illustrated in Figures 5 and 6 and a rotor 356 illustrated in Figures 7 and 8.

Stator 355 has a pressure port 357, a waste port 358, and two other ports 359, 360 that will be described in the following.

Rotor 356 has a shaft 361 rigidly secured thereto; and a crank 362 is rigidly secured to shaft 361, as shown in Figure 4. Crank 362 is operatively connected with armature 141 of solenoid 111. When the latter is deenergized, its armature will be pulled down by weight 354, to the lower limit of its stroke, setting rotor 356 in valve operating position, as shown in full lines (Figure 4); and when solenoid 111 is energized, the armature will be raised to the upper limit of its stroke, shifting rotor 356 into valve closing position as partly indicated in dotted lines. Figure 7 shows the front of rotor 356. There will be noted two passageways 363 and 364 grooved into the face of rotor 356 and adapted in the valve opening position as shown, to interconnect, in stator 355, the pressure port 357 with port 360 and the waste port 358 with port 359. In the valve closing position, the same passageways will bring pressure to port 359 and connect port 360 to waste. A cap or spring 365 Figure 6) will hold the rotor 356 in place, in sliding connection with stator 355.

Pressure and waste ports 357 and 358 are suitably connected by hydraulic leads 366 and 367, respectively, to a source of pressure supply and to waste. Ports 359 and 360 in an arrangement as shown in full lines (Figure 4) are connected respectively to the upper and lower ends of cylinder 350, by leads 368 and 369; and this type connection is illustrative both for influent valve 101 and effluent valve 102. In the three other

| Program function | Valves | | | | | Time assigned (minutes) |
| --- | --- | --- | --- | --- | --- | --- |
| | 101 | 102 | 103 | 104 | 105 | |
| a | Closing | Open | Closed | Closed | Closed | 2 |
| b. Dr. to effl. | Closed | do | do | do | do | 12 |
| c. Dr. to waste | do | Closing | Opening | do | do | 2 |
| d | do | Closed | Open | Opening | do | 2 |
| e. Washing | do | do | do | Open | do | 10 |
| f | Opening | do | Closing | Closing | Opening | 4 |
| g. Rewashing | Open | do | Closed | Closed | Open | 3 |
| h | do | Opening | do | do | Closing | 2 |
| i. Filtering | do | Open | do | do | Closed | 3 |
| | | | | | | Indefinite |

It will be noted that similar program characteristics as herein described obtain in a good many other devices or plants which include process media similar to the herein described filter bed, and valves, movable troughs or other operating parts equivalent to the herein described valves.

valves 103, 104, and 105, as shown in Figure 3, ports 359 and 360 are connected with cylinder 350 in the opposite way, by leads 370 and 371, indicated in dotted lines (Figure 4). That is, energizing the solenoids of group 111 and 112 will secure the corresponding valves in closed position, while energizing the solenoids of group 113, 114 and 115 will secure the corresponding valves in open position.

Some specific objects of this feature will become evident when considering in the following, some of the underlying principles of the herein illustrated filter program and the operation of the electric control system.

Furthermore, it may be noted that more efficient pilot means than herein described may be found in the respective art, or may be specially developed, in accordance with principles herein referred to.

NORMAL OPERATION OF ELECTRIC CIRCUITS AND PROGRAM CONTROL (Figure 2)

A program is started by depressing the push button of program switch 131. When starting from the situation represented in Figure 2, a series of circuits will be established and, as mentioned before, two groups of circuits may be distinguished, the first group serving to control timer motor 130 and the second group being controlled by timer arm 211 and serving to control solenoids 111, etc. The circuits will be designated, for convenience, by numerals 1001, etc. (not shown in the drawings).

There will be established first a timer starting circuit 1001 from A through the normally closed service switch 134, lead 229, the momentarily closed program switch 131, lead 226, mercoid 222, lead 225, and the coil of relay 228 to B. This energizes relay 228, resulting in a timer operating circuit 1002 from A through relay 228, timer motor 130 and the normally closed prolong switch 132 to B; and a timer relay holding circuit 1003 from A through the switch and pigtail of relay 228, lead 226, mercoid 222, lead 225 and the coil of relay 228 to B.

The timer operating circuit, just referred to under 1002, starts timer motor 130, which drives shaft 212.

The program button 131 may be released after being momentarily depressed. This will break the timer starting circuit 1001; however, the timer relay holding circuit referred to under 1003 will hold the timer operating circuit 1002 closed and the timer motor will keep running.

Rotation of shaft 212 will cause contactor 211 to wipe the contacts 191, etc., and 201, etc., disposed on dial 210. In an arrangement as shown, the first contact to be engaged, after arm 211 has moved away from contact 234, is contact 191; and contactor 211 will reach that contact a short time after timer motor 130 has been started, which will result in a solenoid starting circuit 1004 from A through lead 171, the resistor and coil of relay 121, lead 161, contact 191, contactor 211, and brush 213 to B. This will energize relay 121, resulting in a solenoid operating circuit 1005 from A through solenoid 111, lead 151, and the relay 121 to B; and in a solenoid relay holding circuit 1006 from A through lead 171, resistor, coil and switch of relay 121 to B.

The solenoid operating circuit, just referred to under 1005 will energize solenoid 111, raising armature 141 from the valve opening to the valve closing position. This will start piston 351 of influent valve 101 from the upper end of cylinder 350 to the lower end thereof, closing the gate of the valve. Completing such operation of valve 101, which forms the first or (a) function of a washing program, will take a short time as may be assigned for such function. At the end of that function, further movement of the piston 351 will be stopped by cylinder 350 and any flow of pressure and waste water through pilot valve 353 will cease. Similarly, any flow of water through influent valve 101 into filter 100 will cease.

The solenoid relay holding circuit 1006 will hold the solenoid operating circuit 1005 closed. Furthermore, due to the closing of circuit 1006, contact 191 will be energized from lead 161, as well as from arm 211, so that upon arm 211 moving away from contact 191, circuit will not be broken, and the undesirable effects of breaking circuit at a contact of this type are avoided.

Valve operation of function (a) as initiated by the timer, starts the draining to effluent function (b) of the program. The latter function will continue until timer motor 130 turns contactor 211 into such positions on dial 210 that contacts 192 and 193 are engaged.

Desirably contact 193 will be reached first, and if so, another solenoid starting circuit 1004 will flash through arm 211, this time energizing relay 123. Solenoid operating and solenoid relay holding circuits 1005 and 1006 will be established through that relay; solenoid 113 will be energized, and waste valve 103 will be operated through the corresponding pilot valve.

It will be noted that the program at this point calls for the opening of waste valve 103. This feature of the program, in connection with electric features of the system described and which will be referred to later, accounts for the hydraulic leads 370 and 371 of valve 103 being interconnected in a different way than leads 368 and 369 of valve 101 (Figure 4).

While solenoid 113 is energized, and waste valve accordingly opens and remains open, solenoid 111 will remain energized, the solenoid relay holding circuit 1006 through relay 121 remaining completed. Therefore, the influent valve 101 will remain closed.

As soon as contactor 211 reaches contact 192, another series of circuits 1004, 1005, 1006 will follow in relay 122; solenoid 112 will be energized and effluent valve 102 will be closed.

The opening of waste valve 103 and closing of effluent valve 102 constitute the (c) function of a program, starting or including the draining to waste operation.

Shortly following such function, contactor 211 will make contact 194, energizing solenoid 114 through relay 124, and opening backwash valve 104—operation (d). This will start the filter washing—operation (e)—and such function will continue until timer motor 130 turns contactor 211 to make contacts 203 and 204.

Assuming that contact 204 is reached first, there will be made a solenoid deenergizing circuit 1007 from A through lead 174 and the resistor of relay 124 to B. This will in effect short-circuit the coil of relay 124, so that the switch of the same will drop open, breaking the solenoid relay holding and solenoid operating circuits 1006 and 1005 previously established through that relay. This will deenergize solenoid 114. The corresponding pilot valve will now close backwash valve 104.

As contactor 211 moves away from contact 204, circuit 1007 is terminated; however, the resistor of relay 124 prevents, for all practical purposes, a breaking spark damaging this contact or the point of arm 211.

As soon as contactor 211 reaches contact 203, the same deenergizing operation will occur in relay 123, solenoid 113, and waste valve 103.

After another short period contactor 211 will reach a point or points where contacts 195 and 201 are made, energizing relay 125 and deenergizing relay 121. This opens the rewash and effluent valves 105 and 101.

The four steps last described—closing backwash and waste valves 104 and 103, and opening rewash and effluent valves 105 and 101—constitute function (f) of the program. The now following (g) or rewash function will continue until timer motor 130 turns contactor 211 into such positions that contacts 202 and 205 are made.

This will deenergize solenoids 112 and 115, opening effluent valve 102 and closing rewash valve 105—operation (h)—and will thereby start another filtering period (i).

While contactor 211, on shaft 212, has almost completed a 360° turn, pinion 215 has caused gear 216 and shaft 214 to almost complete a 180° effective turn. During all this time roller 220 rides on cam 218, keeping mercoid switch 222 closed. The same position of switch 222 will be maintained while contactor 211 completes its 360° turn. However, on completing its half revolution, cam 218 will drop the roller 220 and open mercoid switch 222. This will break the timer relay holding circuit 1003, deenergizing the coil of relay 228. The switch of said relay will open, breaking the timer motor operating circuit 1002; and timer motor 130 will stop.

Preferably just before mercoid switch 222 is opened, cam 217 will close mercoid switch 221 to prepare for timer starting and timer relay holding circuits through the same.

Furthermore, in completing its cycle, contactor 211 may make contact 234, for purposes to be described later.

It will be noted that in this position both groups of circuits—the timer circuits 1001, 1002, 1003 and the solenoid circuits 1004, 1005, 1006, and 1007—are dead. This is an intended consequence of the arrangement mentioned before and according to which solenoids 111 and 112 are deenergized when the program calls for open position of the corresponding valves, while the other solenoids are energized when the program calls for open positions of the corresponding valves. The filtering function (i), which calls for open position of both influent and effluent valves 11 and 102, may be maintained for a considerable time so that deenergizing solenoids 111 and 112 during that function results in a saving in electric current. Other advantages of the same feature may be found in certain systems which include a plurality of filter units.

A new program may be started whenever the washing of the filter is desired again, by again momentarily depressing program push button 131. The resulting circuits, operations and positions will be substantially the same as hereinabove described, the only difference being that the timer group of circuits 1001, 1002 and 1003 this time will be made through relay 227 and mercoid 221, instead of through relay 228 and mercoid 222.

SHUT-OFF AND PROLONG FEATURES (Figure 2)

It will be seen from the above that any number of programs may be started by depressing program push buttons 131 and will be automatically completed by timer motor 130.

However, it may be desirable to terminate a filter operation (i) without starting another wash program, or to terminate the several functions of a wash program without starting another filtering operation. On the other hand, where a filter has been shut off from service, it may be desirable to put the filter back into service; a backwash being required in the event that the filter was shut off from service in a condition requiring such backwash, but that no backwash was had at that time. At the same time it is not desirable that a filter may be shut off from a program initiated and partly completed by the timer motor, because resuming such program at the correct point would offer unnecessary difficulties both as far as electric control is concerned and regarding proper operation of the filter. Therefore, it should not be possible that a program in course of progress may be interrupted by a shut-off impulse. All these objects are achieved in an extremely simple way as may be seen from the following:

Assuming that filter 100 is in filtering position as shown in Figures 2 and 3, and that it is desired to shut it off from service, the push button of shut-off switch 133 may be depressed. This will make two secondary solenoid operating circuits 1008 from A in parallel through solenoids 111 and 112, and back to B through leads 235 and 236, shut-off switch 133, lead 233, contact 234, contactor 211 and brush 213. This will energize solenoids 111 and 112, closing the influent and effluent valves, and shutting the filter off from service. The filter will remain shut off as long as the push button of shut-off switch 133 remains closed, by means of its spring actuated toggle 232.

Assuming now that it is desired to start a washing program while the push button of the shut-off switch 133 is depressed, it will be seen that even on depressing push button 131 no timer starting circuit 1001 can be made, because incident to the depressing of shut-off button 133 toggle 232 has automatically raised service push button 134, opening the corresponding switch.

Assuming now that it is desired to return the filter to service and thereafter to start a washing program, the service push button 134 will be returned to normal, or depressed position, and following this, program push button 131 will be depressed momentarily. Depressing service push button 134 will tilt the lever to toggle 232 so that shut-off switch 133 will open, the secondary solenoid operating circuits 1008 will be broken, solenoids 111 and 112 will be deenergized and the influent and effluent valves will open. Depressing service push button 134 will also close the corresponding switch, so that on depressing program push button 131, the normal series of circuits and functions of a program will be started and completed, as described above. That is, while the influent and effluent valves subsequent to breaking shut-off circuits 1008, have started opening, the influent valve will be closed again when contactor 211 makes contact 191, and the other valve operations and positions will follow as described.

Assuming now that the filter originally was in filtering position (i) as shown in Figures 2 and 3, that then a washing program was started by depressing push button 131, and that thereupon it is desired to shut off the filter, while some function previous to filteration is still in course of progress. Shut-off push button 133 will be depressed with the following results. No secondary solenoid operating circuit 1008 can be completed immediately, as timer motor 130 has turned contactor 211 away from contact 234. In other words, the filter will be shut off from service only when locking shut-off push button 133 in depressed position, and maintaining it in such position until the timer motor has completed a full turn of shaft 212 and arm 211 has returned to contact 234. Thereupon, secondary solenoid operating circuits 1008 will be made automatically as described before, and the filter will be shut off from service.

It may be desirable, from time to time, to prolong the timed functions of a program in course of progress, beyond the time permitted by a given setting of the timer. For this purpose, the prolong switch 132 may be opened by depressing the corresponding button. This breaks the timer operating circuit 1002 but not the timer relay holding circuit 1003, nor the solenoid group of circuits. The timer motor will be stopped, leaving solenoids 111, etc., in their last positions. When releasing the prolong push button, the prolong switch will complete the timer operating circuit 1002 and the program will proceed as before from the point of interruption. This enables the operator to give more time to washing, or to draining the filter than is usually needed, and provided for by the timer setting, without readjusting the timer contacts, to take care of a single unusual condition existing only temporarily.

SEPARATE CONTROL MEANS (Figures 9, 10 and 11)

In operation as so far described the several program functions are timed, but the filtering phase is indefinite; any new washing phase is started by manually depressing the program push button.

It has been mentioned that in standard practice a filter is washed when the loss of head gauge 315 indicates a certain loss of head or similar condition in filter bed 305. Figure 9 is a diagram showing means to automatically start a new program on reaching a predetermined loss of head. A loss of head gauge acts as a condition detector, controlling the filtering function which by such control becomes a definite, although not a time-controlled function of a complete program.

The pointer 325 of loss of head gauge 315 (Figure 3) is actuated by and insulated from pulley 324, and receives current from A, through service switch 134 and brush 401 (Figure 9). Dial 326 has contacts 402, 403 and 404 adjustably secured thereto and insulated therefrom. A-circuit received through 402 will energize a three-wire relay 405 through the coil and resistor thereof to B, and relay 405 will be held closed by A-circuit received through lead 406, but will be deenergized through contact 404. A-circuit received through 403 will energize the single pole relay 407 through relay 405, and when so energized, the relay 407 will connect leads 224 and 226 to A, starting a program as described before.

At the start of a filtering function (i), contactor 325 will be in its zero position at the extreme left hand side of dial 326. When the loss of head, incident to filtration, has increased to a predetermined amount, a starter relay energizing circuit 1009 will be made from A through switch 134, brush 401, contact 402, coil and resistor of 405 to B. This will energize relay 405, and a starter relay holding circuit 1010 from A through lead 406, the switch, coil and resistor of relay 405 to B will hold the relay closed as filtration goes on. Contact 403 will be set a short distance from 402, and when contact 403 is made, there will be established two automatic timer starting circuits 1011 and 1012 including (1) a circuit from A through 134, 401, 403, 405 and the coil of relay 407 to B, energizing relay 407, and (2) a circuit from A through 134, 401, 403, 405 and the switch of relay 407 to either one of leads 224 or 226, which will be prepared to receive a program starting impulse. During the now following draining to effluent (b) and other functions, contactor 325 will overtravel contact 403 and will make contact 404 at the extreme right hand side of dial 326, causing a starter relay deenergizing circuit 1013 from A through 134, 401, 404 and the resistor of relay 405 to B. Thereupon, contactor 325 may return to its initial position, during or after the program function (h) which starts another filtering period (i). Although the pointer 325 will pass the contact 403 again, incident to such climbing back, no washing program will be started at this incident, the relay 405 being deenergized until contact 402 is made again. A contact corresponding to and parallel with 404 may be secured to the extreme left hand side of dial 326.

When shutting the filter off, by depressing push button 133, pointer 325 will also move to the extreme right hand side; when restoring the filter to service by depressing service button 134, the pointer will climb back to its last position. In this event, contact 403 will be made twice, but will be inoperative both times. The first time, no A-circuit will be received, as spring-toggle 232 has opened switch 134, and the second time, relay 405 will be open. However, contact 402 closes relay 405 again, so that the same will be prepared to receive a program starting impulse when the maximum allowable loss of head is reached again, incident to continued filtration.

An automatic starter, as shown in Figure 9, will control the filtering function (i) in cooperation with, but independently of any setting of the timing mechanism. In a similar way, there may and in certain instances should be provided means to independently and/or remotely control other functions of a process medium, especially such functions as may or should be variable as to the periods of time allotted to the same. Preferably, such means are actuated by condition detectors. An illustration will be found in Figure 10, showing a system wherein the draining to effluent function (b) is substantially controlled from a liquid level gauge.

Liquid level indicator 314 (Figure 3) is shown in this figure as including a float 408, a rod 409 mounted thereon and a contact 410 secured to and insulated from said rod, and connected to source A. Brushes 411, 412 and 413 are so disposed, respectively, as to be engaged by contact 410 when float 408, in dropping down from level 313, approaches level 327; when it rides at level 313; and when it drops below that level. There is provided a relay 414, similar to relay 405 (Figure 9) in construction, and so interconnected that it will be closed when contact 411 is made, and opened when contact 413 is made. A normally open relay 415 is energized through relay 414 when contact 412 is made, and includes a single pole connected to A and two contacts which are connected, respectively, to mercoids 221 and 222, the circuits being completed through the coils of the respective relays 227 and 228 to B. Program switch 131 in this modification includes a push-button adapted to engage the contact 191, and as a consequence, that contact and the blank space following the same in the embodiment of Figure 2, are eliminated from timer dial 210.

Depressing push-button 131 will complete an auxiliary solenoid starting circuit 1004a from B through the closed service switch 134, program switch 131, coil and resistor of relay 121 to A, energizing relay 121. This will establish solenoid operating and relay holding circuits 1005 and 1006 as described before, to close the influent valve 101. This function (a) will be followed by draining to effluent (b), and as a result, float 408 will drop below level 313. After a time, contact 410 will engage the brush 411, making starter relay energizing and holding circuits 1009 and 1010 through relay 414. Shortly thereafter, contact 412 will be made, and an auxiliary relay starting circuit 1011 will be established through relay 415, resulting in a timer relay starting circuit 1001 through the same and either one of relays 227 or 228, as may be prepared to receive this impulse. The following operation will be exactly as described before (Figure 2), except that a closer control over the time relation of the several functions will be had, as the lengthy blank space following contact 191 (Figure 2) is eliminated on dial 210.

It will be noted that controlling the draining to effluent function on a level or volume basis rather than on a time basis may be preferable in certain instances; particularly where no water or as little water as possible should be drained to waste.

Another way to save water may involve condition control of the washing function. A test controller for the washing function is illustrated by Figure 11.

The timer motor 130 is shown with operating circuit 1002 closed through relay 227. The timer starting and relay holding circuits, also the solenoid circuits need not be shown. Waste pipe 332 of filter 100 includes an orifice 420 or the like, causing a bypass flow through a glass tube 421 as long as there is any flow of water through pipe 332. A source of light 422 throws light on a photocell of the photo-conductive type 423, through glass tube 421. Cell 423 receives circuit from battery 416 through lead 417 and the adjustable resistor 424, the circuit being completed through the coil of a relay 425, which is of the back contact type in that it completes a circuit when deenergized, and which is normally energized through cell 423 and resistor 424.

As long as no water at all, or clear water passes through glass tube 421, relay 425 will remain energized by the tester relay controlling circuit 1014 passing through the same, but as soon as wash water carrying impurities flushed out of the filter passes through glass tube 421, the resistance of cell 423 will be increased; and resistor 424 may be so adjusted that the presence of a certain amount of such impurities in tube 421 will in effect deenergize relay 425. This will complete a tester relay controlled circuit 1015 through the same, which energizes a coil 426 opening the normally closed prolong switch 132 by means of an armature 427 secured to the same, and thereby breaking the timer motor operating circuit 1002.

Assuming that resistor 424 has been suitably adjusted, operation will be as follows. Previous to and immediately following the start of the washing function (e), clear water from the draining to waste function (c) passes through glass tube 421, so that cell 424 will keep relay 425 energized. As the washing proceeds, impurities washed out of the filter bed will be carried through pipe 332 and also through glass tube 421, causing cell 423 to deenergize relay 425. This will result in coil 426 depressing the prolong push button 132, so that timer motor 130 will stop shortly after contact 194, controlling the backwash valve 104, was made. The washing operation will continue, and after a certain time, which may be variable, the water passing through glass tube 421 will become clear again, the sediment being washed out of filter 100. This will energize relay 425, deenergizing coil 426, which closes switch 132 and causes timer motor 130 to resume its operation. After a predetermined period, controlled by the timer, and which may be made very short or may be practically eliminated altogether, contacts 204 and 203 will be made, stopping the washing function (e). Thereupon, and during the following rewash function, etc., no water at all or clear water will pass through tube 421, so that relay 425 will be kept energized and coil 426 will remain deenergized until another backwash operation is started and turbid water flowing through the tester tube causes the timer to stop.

CYCLE OF TIMED AND SEPARATELY CONTROLLED FUNCTIONS (Figure 11)

Manual or automatic operation of prolong switch 132 as described, makes the operation of timer motor 130 intermittent. Such intermittent operation of a timer motor may be advantageous in certain cases, not only in that it allows for long or variable functions being controlled more adequately than by mere timing means, but also on account of the fact that thereby the timer cycle available is exclusively utilized for the timing of functions the aggregate period of which is relatively short—a slower running and more precise timer may be used.

Figure 11 illustrates diagrammatically the electric circuits of a system wherein timer operation is intermittently controlled by condition detectors while the solenoid group of circuits is identical with the corresponding group as shown in Figure 2.

Timer motor 130 in this modification receives circuit through the switch of a main relay 500, which is of the three-wire type and normally open.

The first start of timer motor 130 is accomplished in a similar way as illustrated in Figure 9. Contactor 325, forming part of a loss of head gauge, will make contact 402, making starter relay energizing and holding circuits 1009 and 1010 through relay 405. Shortly thereafter there will be made an auxiliary relay energizing circuit similar to circuit 1011, through relay 407, establishing a main relay energizing circuit 1016 from A through resistor and coil of relay 500 and relay 407 to B. This will energize relay 500 and start timer motor 130.

Relay 500 will be held closed by a main relay holding circuit 1017 from A through its resistor, coil and switch to B.

The now following rotation of timer shaft 212 will again cause contactor 211 to wipe the contacts disposed on dial 210.

In an arrangement as shown, the first contact to be engaged, after contactor 211 has moved away from contact 234, is contact 191. Contactor 211 will make that contact a short time after timer motor 130 has been started. This will result in a solenoid starting circuit 1004 through lead 161, followed by solenoid operating and solenoid relay holding circuits 1005 and 1006 through relay 121.

An auxiliary ratchet relay 501 is adapted, when energized to rotate a ratchet and a switch member 502 secured thereto and insulated therefrom, about 120°. Three arc-shaped contacts 503, 504 and 505, covering not quite 120° each, are disposed in a circle, wiped by the contactor of switch 502, and are set 120° apart with their corresponding ends. Three smaller contacts 506, 507 and 508 are disposed in a concentric circle, each of them being set at but a few degrees from one end of the corresponding contact 503, 504 or 505, such end being the far one in the direction of rotation of contactor 502. The contacts 503, 504 and 505 are connected respectively to leads 161, 164 and 233. Contactor 502, by means of brush 509, is connected to the coil of ratchet relay 501, the coil circuit being completed to A. Contacts 506, 507 and 508 are connected to the resistor of relay 500 so as to short-circuit the coil of the same.

At the same time a solenoid starting circuit is made through contact 191 and lead 161, there will be completed two main relay deenergizing circuits 1018 and 1019 as follows: tracing from B, circuit will be made (1) through brush 213, contactor 211, contact 191, lead 161, contact 503, switch 502, brush 509 and the coil of relay 501 to A; this will raise the pawl and turn the ratchet of relay 501, whereby switch 502 will be turned out of contact with arc 503 and into contact with the following arc 504, so that finally the coil of ratchet relay 501 will be deenergized and the pawl will drop down inoperative. Incident to this 120° turn, B-circuit will be made momentarily (2) through brush 213, contactor 211, contact 191, lead 161, contact 503, switch 502, contact 506 and the resistor of relay 500 to A; this will deenergize the last named relay, stopping timer motor 130.

The impulse received in relay 121, as mentioned before, has started a draining to effluent function in filter 108, causing contactor 325 to make a starter relay deenergizing circuit 1013. Furthermore, liquid level indicator 314 (Figure 10) will register the gradual dropping of liquid level 313. Contact 410 will approach and finally engage the brush 411, making starter relay energizing and holding circuits 1009 and 1010 through relay 414. Shortly thereafter, contact 412 will be made, and an auxiliary relay starting circuit 1011 will be established through relay 415, resulting in main relay energizing circuit 1016 through the same, which energizes relay 500 and starts timer motor 120. Relay 500 will again be held closed by a main relay holding circuit 1017. Relay 515 will be deenergized by a circuit 1013, as the liquid level drops below 327.

Contactor 211 will now engage a number of contacts, as described before, and will finally make contact 194 to relay 124. This contact by means of lead 164 is connected to arc 504, so that another set of main relay deenergizing circuits 1018 and 1019 will be made; switch 502 will be turned into contact with arc 505, and timer motor 130 will be stopped.

The impulse received in relay 124, as mentioned before, has started a washing function in filter 108, and photocell 423 will register the turbidity of wash water withdrawn to waste, and will transmit the corresponding impulse to still another starter relay 520. In an arrangement as shown in Figure 11, this relay is normally held energized by a circuit 1014, cell 423 being normally exposed to light. However, as soon as turbid water, carrying impurities from filter 108, is withdrawn, the coil of relay 520 will be deenergized. Pawl 521, which forms a part of this relay, will then drop down and will be prepared to engage ratchet 522, which is secured to and insulated from a switch 523, receiving B-circuit through brush 524. As soon as the water becomes clear again, the circuit 1014 through relay 520 will be completed again, and ratchet 522 will turn switch 523, completing another main relay energizing circuit 1016 through relay 500, switch 523 and brush 524, which starts motor 130 on the last part of its cycle. A main relay holding circuit 1017 will follow again.

The remaining contacts on dial 210 will be made in timed relation, as described before, and when completing a 360° turn, contactor 211 will engage contact 234 connected to lead 233. This lead is connected to arc 505, through which a last set of main relay deenergizing circuits 1018 and 1019 will be made. Thereupon both contactors 211 and 502 will be in their initial positions, prepared to receive another set of starting impulses.

When comparing the herein described modification with the system of Figure 2, it will be found that during each cycle or program according to Figure 11, main relay energizing and holding and timer operating circuits are alternately made and broken, a number of times, the breaking of such circuits being accomplished by electrical means controlled by the timer; while in the program of Figure 2, a single set of timer circuits was made and was finally broken by mechanical means controlled by the timer. The solenoid group of circuits is the same in both figures, except that a closer control of the several solenoid starting and deenergizing circuits will be had in the system of Figure 11.

A tabulation of circuits according to the system of Figure 2 will be found in chart #1; and a tabulation of circuits of the modified system of Figure 11 will be found in chart #2. In each chart there will be found a list of the several timer and solenoid circuits, of the relays through which they are made, and of the functions during which they are made and/or maintained. Momentary circuits are indicated thus (*) and permanent circuits thus *.

*Chart 1*

| Relays | Circuits | Functions |||||||||||
|---|---|---|---|---|---|---|---|---|---|---|---|
| | | Start | a | b | c | d | e | f | g | h | i |
| 227 or 228 | 1001, 1002, 1003 | (*) | * | * | * | * | * | * | * | * | |
| 121 | 1004, 1005, 1006, 1007 | | (*) | * | * | * | * | | (*) | | |
| 122 | 1004, 1005, 1006, 1007 | | | | (*) | * | * | * | * | (*) | |
| 123 | 1004, 1005, 1006, 1007 | | | | (*) | * | * | (*) | | | |
| 124 | 1004, 1005, 1006, 1007 | | | | | (*) | * | (*) | | | |
| 125 | 1004, 1005, 1006, 1007 | | | | | | (*) | * | (*) | | |

Chart 2

| Relays | Circuits | Start | a | b | c | d | e | f | g | h | i |
|---|---|---|---|---|---|---|---|---|---|---|---|
| 405 407 500 | 1009 1010 1011 1013 1016 1017 | (*) (*) | (*) | | (*) | | | | | | |
| 501 | 1018, 1019 | | (*) | | | | | | | | |
| 516 517 500 | 1009 1010 1011 1013 1016 1017 | | | (*) (*) | (*) (*) | | | | | | |
| 501 | 1018, 1019 | | | | (*) | | | | | | |
| 520 523 500 | 1014 1016 1017 | * | * | * | * | * | | (*) | * | * | |
| 501 | 1018, 1019 | | | | | | | | | | (*) |
| 121 | 1004 1005, 1006 1007 | | (*) | * | * | * | * | (*) | | | |
| 122 | 1004 1005, 1006 1007 | | | | (*) | | | | (*) | | |
| 123 | 1004 1005, 1006 1007 | | | | (*) | * | | (*) | | | |
| 124 | 1004 1005, 1006 1007 | | | | | (*) | * | (*) | | | |
| 125 | 1004 1005, 1006 1007 | | | | | | (*) | * (*) | | | |

Furthermore, it will be noted that provision is made for automatic control of a program of a process medium, said program including two groups of functions which may be described either as functions of long and short duration, or as functions of variable and constant duration. Individual means are used for the control of each group of functions. It is known, for instance in the water softening art, to individually control, on the one hand, functions subject to measurement by certain means, and on the other hand, functions which are better measured by individual means, as for instance the brining function in the water softening cycle. Such individual control of certain functions is different from the individual control as herein described. In the softening process, according to certain features of the program, the functions referred to require separate volume control rather than the time, volume or other control applied to other program functions. On the other hand, the differential control as herein contemplated, is based on the fact that certain program functions may require or allow differential timing characteristics, and that such differential timing may improve the time control in general.

BATTERY CONTROL
(Figures 13, 14)

When the programs of two or more filters or the like are to be initiated automatically, it may be desirable to make provision to prevent more than one of the units from performing certain functions at a time. For instance, since the flow of wash water needed to wash a filter ordinarily is so great as to preclude washing more than one at a time, the washing functions in two or more filters should not overlap.

It is not necessary to wait until the end of a program on one filter and its restoration to filtering service before starting a program on a second filter. All that is necessary is to prevent two being in the washing function simultaneously. Consequently the program on a second filter may be initiated at any time that will not cause a washing lap. The time that may be so gained may not be important in a small plant having only a few filter units but it may become very important in a large plant having a considerable number of beds. Means for accomplishing this will now be described.

As shown in Figures 13 and 14 a synchronous selector motor 669, energized from the source A, B through the leads 671 and 672 is geared to rotate its shaft 670 in a given time. A friction pinion 680 (see Figure 14) slidably mounted on the shaft 670 is held in any position along the shaft 670 by the set screw 681. A friction disc 682 on the shaft 684 is rotated by the friction pinion 680 and may, by adjustment of the latter along its shaft 670 be set to make a revolution in the time taken to complete two or more programs of functions or parts thereof, as from a to f, depending upon the number of filters in the battery. Contact arm 667 is secured to disc 682 by means of shaft 684 and is movable by the same in relation to the stationary disc 683. If the timing of the functions is shortened, then the friction pinion 680 may be adjusted to the left along the shaft 670 to correspond with the shortened period, or vice versa. Thus for example, with a battery of two filters for which Figure 13 shows the control, the dial 683 is provided with two contacts 665 and 666, and the continuous rotation of the hand contactor 667 on the shaft 684 provides for completing the circuit through line 668 from the source B alternately to contacts 665 and 666 every 40 minutes, or in a greater or lesser time, depending upon the adjustments explained previously. Obviously, for three or more filters there would be a corresponding number of contacts on the dial 683 equally spaced and with the time allowance properly adjusted.

In Figure 13 elements 601 and 631 are the loss of head indicators for filters Nos. 1 and 2 (not shown). Elements 600 and 630 are solenoids for operating the program push-buttons of the two filters. These buttons operate as explained in connection with Figure 2 to close the timer starting circuit 1001. The showing of these button parts in Figure 13 is therefore omitted.

Assume that the loss of head of filter No. 1 has increased so that the arm 624 of its dial 601 has moved up to the contact 603. Thereupon, a starter relay energizing circuit 1009 from source A passes through line 625, brush 606, hub 605, arm 624, contact 603, line 613, coil 610 and resistor 611 of relay 607, to be completed through line 616 to B. This energizes relay 607, closing switches 608 and 609. The latter will then receive starter relay holding circuit 1010 from A through line 615, holding the relay closed even when arm 624 moves past contact 603.

The contact 602 is elongated so that if arm 624 reaches it just after the arm 667 has passed contact 665, 624 will remain on 602 until 667 again reaches 665 even though there be increase in loss of head during this period. When completed, a primary automatic timer starting circuit 1020 from source B passes through line 668, arm 667 and contact 665 of the selector interlock, line 662, coil of relay 620, line 661, pole 608 of relay 607, line 612, contact 602, arm 624 now in contact with same, hub 605, contact 606, and line 625 to source A. This circuit therefore energizes the coil of relay 620 which closes its normally open switch thereby completing a secondary automatic timer starting circuit 1021 from the source A, B through lines 621 and 623 to coil of solenoid 600. The solenoid 600 being thus energized depresses the program button, closing the timer starting circuit 1001 for filter No. 1.

The circuit 1021 through the coil of relay 620 is soon broken by the arm 667 of the selector interlock moving past the contact 665.

Upon the completion of function b of the program for filter No. 1, the effluent valve is closed and the loss of head gauge 601 will indicate a higher value thereupon bringing the arm 624 into contact with 604. This will complete the starter relay de-energizing circuit 1013 from source A through line 625, arm 624, contact 604, line 614, resistor 611, and line 616 to B, thus short-circuiting the coil 610 of relay 607. The coil 610 of relay 607 being thus deenergized opens the poles 608 and 609 of relay 607, thus breaking the holding circuit 1010 of relay 607.

When the washing phase of filter No. 1 is completed and function i is restored, the loss of head being now greatly reduced, the arm 624 of the gauge 601 will move to the left toward the zero mark. In so doing, contact will be made between the arm 624 and the contact 602, but the initiating circuit 1020 for another program will not be completed even though the arm 667 of the selector interlock should at the same instant be in contact with 665 because the coil 610 of relay 607 being deenergized, the pole 608 of relay 607 is open.

Further movement of the arm 624 to the left brings it to contact 603 making circuit 1009 and finally to the zero mark on the dial 601.

The washing phase of filter No. 1 will be completed before arm 667 moves from contact 665 to contact 666, but if during this time filter No. 2 builds up a loss of head sufficient to bring the arm 654 of its loss of head gauge 631 in contact with the elongated adjustable contact 632, initiation of the washing program of filter No. 2 will be held in abeyance until the arm 667 reaches contact 666. When arm 667 of the selector now reaches contact 666, a circuit 1020 is completed from the source A, line 625, contact 636, hub 635, arm 654, contact 632, line 642, pole 638 of relay 637, line 663, coil of relay 650, line 664, contact 666, arm 667 and line 68 to source B. Relay 650 closes its switch completing circuit 1021 from the source B through lines 651 to 652, coil of solenoid 630 and line 623 to source A. The solenoid 630 therefore closes a timer starting circuit 1001 by depressing the program button of filter No. 2 in the manner shown and described before.

It will be apparent from the preceding that once the contact at the loss of head gauge for a filter is made, that filter will have its program initiated at the beginning of the next period allotted to same by the interlock timer. Also since the timer intervals for the filters are of sufficient length and alternate with each other, or follow each other in rotation where more than two filters are concerned, no two filters will be put into washing phase at the same time.

This form of control has the disadvantage where more than two filters are concerned that the rotation of their time intervals may result in undesirable delay in washing a filter, since when it has once been passed by the interlock timer it must wait at least for a period equal to the sum of functions a to e allowed for all the filters before its turn again arrives, although none of the other filters may need washing. This loss of time is overcome by the form shown in Figure 15.

MODIFIED BATTERY CONTROL
(Figure 15)

Referring now to Figure 15 the motor 769 is geared to drive the shaft 770 and the selector arm 767 at a relatively rapid rate so that contact will be made with the contacts on disc 782 at intervals of a few seconds, there being one of the latter contacts for each filter, three being shown.

The motor 769 receives power (circuit 1024) from the source B through line 794, pole 797 of relay 795, line 796 and back to A through line 771, as long as the coil 799 of relay 795 is held energized from A through line 897, pole 798 of relay 795, coil 799 and resistor 894 to B (circuit 1022).

Loss of head gauge 601 and starting solenoid 600 are associated with filter No. 1, whose selector dial contact is 692. Another loss of head gauge 701 and starting solenoid 700 are associated with filter No. 2, whose selector dial contact is 792. And another loss of head gauge 801 and starting solenoid 800 are associated with filter No. 3, whose selector dial contact is 892.

Assuming now that filter No. 3 has built up a loss of head that moves the arm 824 on its loss of head gauge dial 801 over to the elongated and adjustable contact 802, following which the selector arm 767 reaches the selector dial contact 892, and assuming further that relay 795 is energized, the following will occur.

There will be completed circuit 1023 from A through line 625, arm 824, contact 802, line 812, relay 807 (previously closed by a circuit 1009), line 890, selector contact 892, arm 767, line 768, resistor 894 of relay 795, back to B thus short-circuiting the coil 799 of relay 795. The poles of relay 795 therefore will open, thus breaking the holding circuit through the pole 798 of relay 795, and also the circuit 1024 from the source B to line 796 and the motor 769 at the pole 797 of relay 795. The motor 769 therefore will stop when selector arm 767 makes contact with 892, with arm 824 of the loss of head gauge 801 in contact with 802.

It will be noted also that when the above-mentioned circuit 1023 is completed from A through line 625, arm 824, contact 802, line 812, relay 807, line 890, etc., a circuit 1020 is also made through arm 767 to contact 893 on dial 782 to line 891, coil of relay 820 to B. Relay 820 closes its switch, completing the circuit 1021 from source A through the coil of solenoid 800, to source B. Thus energized, the solenoid 800 acts to operate the program button of filter No. 3 in the manner shown and described in connection with Figure 13.

The washing phase of filter No. 3 having been initiated as explained above, is now carried on while the motor 769 remains stopped with selector arm 767 remaining in contact with contacts 892 and 893.

At the end of function c in the program of filter No. 3 the closing of its effluent valve 102 (see Figure 3) will result in the arm 824 of its loss of head gauge 801 moving to the right, as previously explained. Arm 824 will thereupon contact with 804 completing the circuit 1013 from A, line 625, arm 824, contact 804, line 814, the resistor of relay 807, and back to B, thus short-circuiting the coil of relay 807, which thereupon opens its two poles breaking the circuit 1023 to the selector contact 892, arm 767 to line 768; also the circuit 1020 through arm 767 to contact 893 and line 891 to the coil of relay 820 thus deenergizing the latter to open its switch to deenergize solenoid 800. Thus the program button of filter No. 3 is released, and relay 795 is prepared to be energized again.

Incident to the further course of its program the filter No. 3 will go through function d, during which the backwash valve 830 of that filter will open. Tailrod 880 secured to the piston of valve 830 and insulated therefrom and from its cooperating parts, has a finger 884 pivotally secured thereto, and a light spring 885 secured to tailrod 880 holds finger 884 in horizontal or substantially horizontal position, against a stop 886. As backwash valve 830 opens, finger 884 will hit one of two poles 882 and 883 of switch 881, said poles being made of flexible material but less yieldable than spring 885, so that finger 884 will be carried past both poles 882, 883 but will not establish contact between them. At the end of the backwash function e, valve 830 will close again, and in so doing the finger 884 resting against stop 886 will engage pole 883, and at this instance, contact will be made between poles 883 and 882. As the closing of valve 830 is completed, poles 883 and 882, in contact with one another, will be bent downwardly, until they are finally released, whereupon they will resume their former position and the contact established between them will be broken. By means of the momentary closing of switch 881, incident to the closing of backwash valve 830, a circuit 1025 is established from A through line 896, poles 882 and 883, line 895, coil 799 and resistor 894 of relay 795 to B, energizing relay 795 which will be held closed through line 897, and will start motor 769 and arm 767 rotating again.

Filter No. 3 will have its washing phase terminated in due course by return to function i, whereupon as previously explained in connection with Figure 13, the loss of head gauge will move its arm 824 toward its zero position. In so doing it will pass contact 802, but this will not complete the circuit therethrough because the poles of relay 807 are at this time open and thus the premature initiation of another program cannot take place even though contact between 824 and 802 should take place at the exact moment the selector arm 767 passes contacts 892 and 893.

In moving toward the zero mark of the gauge 801 the arm 824 after passing the contact 802 will shortly reach contact 803. This will complete the circuit 1009 of relay 807 and relay 807 thereupon will close and will be held closed by circuit 1010. Relay 807 will close the gap between line 812 and line 890 but the circuits 1020 and 1023 in which these are comprised will not again be completed to initiate a washing program for filter No. 3 until its loss of head gauge arm 824 again reaches contact 802 and also the selector arm 767 reaches contacts 892 and 893.

If, during the washing program of filter No. 3 the loss of head of say filter No. 2 has built up so that the arm 724 of its loss of head gauge 701 has moved up to the contact 702, the washing program of filter No. 2 will be held in abeyance and it will remain in filtering service because at the time the selector motor 769 will not be running and circuit from A through line 625, arm 724, contact 702, line 712, relay 707, line 790, selector contact 792 to arm 767 of selector 782 cannot be completed.

When the washing function e of filter No. 3 is completed and the motor 769 again started as above referred to, selector arm 767 moves away from contacts 892 and 893 and soon reaches contacts 692 and 693 associated with filter No. 1.

The circuits from arm 767 to contacts 692 and 693 cannot now be completed if and as the loss of head of filter No. 1 is not sufficient at the time to bring the arm 624 of dial 601 associated with filter No. 1 into contact with 602. The motor 769 therefore continues to run and in a few seconds selector arm 767 reaches contacts 792 and 793 associated with filter No. 2, whereupon the completion of the "off" circuit to relay 795 will stop the motor 769 and the completion of the circuit through the coil of relay 720 will result in energizing the solenoid 700 and the operation of the program button associated with filter No. 2.

It will be understood from Figure 15 that the switches 681, 781 and 881 are associated respectively with filters Nos. 1, 2 and 3, and that the program initiating circuit for any one of the filters that is closed at its loss of head gauge is completed only when the selector arm 767 reaches the selector contact associated with that filter and that simultaneously with the completion of any filter program initiating circuit the selector motor stops and remains stopped until the actual washing operation of that filter (function e) is finished. Thereupon the switch associated with that filter causes the closing of the circuit through relay 795 so that the selector resumes running to be stopped again when its arm 767 reaches the selector contacts associated with the next filter to reach a predetermined loss of head. It is apparent that in this form there may be any number of filters associated under control and that each will be put into its washing program when needed as determined by the loss of head through it, subject only to the few seconds delay in the action of the selector, plus from time to time the delay due to draining and washing a prior filter. This latter delay is not much more than the minimum delay that would occur with a manually operated plant where two filters cannot be washed at once.

Still other modifications of my battery control are possible; and it will be apparent that various combinations of arrangement of the above described parts may be made and the forms thereof changed; also that the circuits may be differently arranged, all without departing from my invention.

I claim:

1. In combination with a process medium, operating means for said process medium, electric means for automatically controlling said operating means to control a program of said process medium, means for starting and stopping said electric means, means adapted to detect a condition of said process medium and means for suspending and resuming the operation of said electric means, said suspending and resuming means including means controlled from said electric means to suspend operation of the same and controlled from said condition detecting means to re-energize said electric means to resume operation of said electric means again when a predetermined condition of said process medium is obtained.

2. In combination with a sand filter, a piping system equipped with valves adapted to operate said filter for filtration and backwash, a timer adapted to control a certain period for said backwash, means for starting and stopping said timer and means adapted to detect a function of such backwash and also adapted to control said timer starting means when a predetermined condition of the said backwash function is obtained.

WALTER J. HUGHES.